United States Patent
Aronne

[11] Patent Number: 5,318,252
[45] Date of Patent: Jun. 7, 1994

[54] PILOT EJECTION LEG RESTRAINT ASSEMBLY

[75] Inventor: Armand J. Aronne, S. Massapequa, N.Y.

[73] Assignee: Grumman Aerospace Corporation, Bethpage, N.Y.

[21] Appl. No.: 35,295

[22] Filed: Mar. 22, 1993

[51] Int. Cl.⁵ ............................................. B64D 25/115
[52] U.S. Cl. ............................ 244/122 AG; 244/122 R
[58] Field of Search ........ 244/122 AG, 122 R, 122 B; 297/480, 485

[56] References Cited

U.S. PATENT DOCUMENTS

| | | | |
|---|---|---|---|
| 2,940,701 | 6/1960 | Beem et al. | 244/122 AG |
| 3,202,384 | 8/1965 | Martin | 244/122 AG |
| 3,502,073 | 3/1970 | Stanley | 244/122 AG |
| 3,957,231 | 5/1976 | Miller et al. | 244/122 AG |
| 5,072,897 | 12/1991 | Aronne | 244/122 AG |

Primary Examiner—David A. Bucci
Assistant Examiner—Anne E. Bidwell
Attorney, Agent, or Firm—Pollock Vande Sande & Priddy

[57] ABSTRACT

An aviator suit is provided with a sewn-on channel of hook and eye material which encloses an elongated line that extends to a floor bracket by a shear fastener. The enclosed line prevents snagging on objects within a cockpit and becomes easily removed when the VELCRO gives way during ejection when forces are exerted upon the enclosed channel line. A simplified snubber plug is releasably clamped to the aviator's seat and becomes released after the aviator has cleared a cockpit.

1 Claim, 3 Drawing Sheets

PILOT EJECTION LEG RESTRAINT ASSEMBLY

FIELD OF THE INVENTION

The present invention relates to aviator leg restraints, and more particularly to an improved snubber module.

BACKGROUND OF THE INVENTION

Military aviators are frequently fitted with a leg restraint system which pulls an aviator's legs together during cockpit ejection, thereby preventing physical injury to his limbs.

The most common leg restraint system currently used includes leg garters that must be attached with fittings to the seat leg line system. Sometimes these lines snag on objects within the cockpit or are too long or too short. The result is time-consuming adjustments. Further, the current leg garters include a number of fittings which create undue expense and reliability problems.

BRIEF DESCRIPTION OF THE PRESENT INVENTION

The present invention does not employ leg garters. Rather, a reinforced, adjustable strap is present with an attachment ring at the ankle area of an anti-G aviator suit. The attachment ring may be mounted to a stirrup on the anti-G garment to keep it properly positioned.

A line with a detachable fitting is hooked onto the attachment ring and extends through a channel sewn to the anti-G suit. The channel may be in the form of elongated VELCRO closure flaps that are forced open during ejection.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
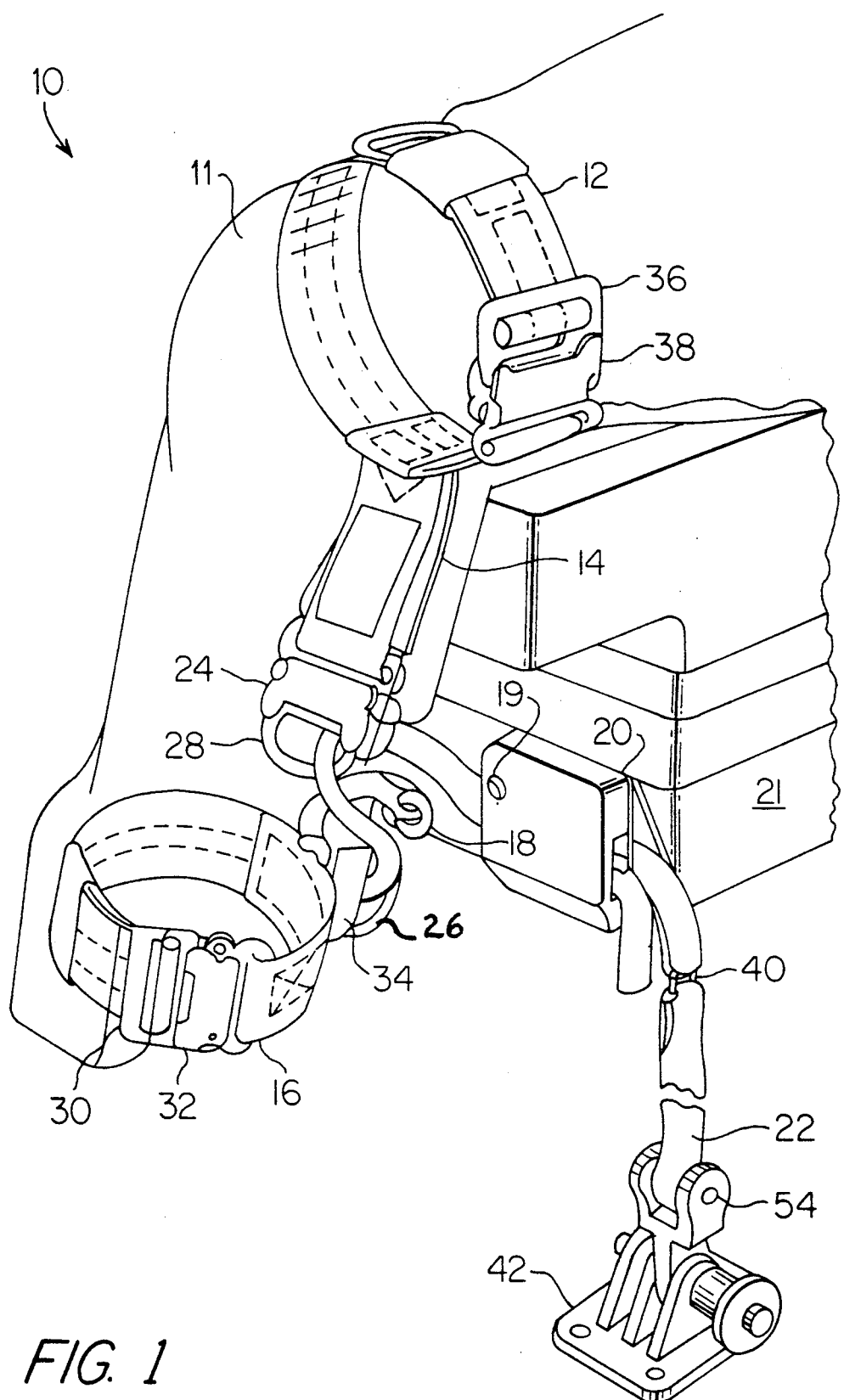
FIG. 1 is a perspective view of a prior art system.

Prior to discussing the present invention, a commonly employed leg restraint in use today will be discussed. The prior art leg restraint 10 is shown in FIG. 1 and primarily includes an upper garter 12, a pendant strap 14, a lower garter 16, a tapered plug 18 in leg line lock 19, a snubber box 20, and a leg restraint line 22. The prior art leg restraint 10 secondarily includes a quick-release connector 24, a "D" ring 28, another "D" ring 26, an adjusting buckle 30, another quick-release connector 32, yet another quick release connector 34, another adjusting buckle 36, still another quick-release connector 38, a break ring 40, and a floor bracket 42.

The upper garter 12 is affixed to the user's thigh by means of the adjusting buckle 36 and the quick-release connector 38. One end of the pendant strap 14 is sewn to the upper garter while the other end is connected to the quick-release connector 24 which contains the "D" ring 28.

The lower garter 16 is affixed to the user's calf by means of the adjusting buckle 30 and the quick-release connector 34 which contains the "D" ring 26.

One end of the leg restraint line 22 is pivotally attached to the floor bracket 42. The other end passes through the snubber box 20. Before entering the snubber box 20, an intermediate break ring 40 is provided for emergency if the shear rivet 54 does not break upon ejection. As the leg restraint line 22 exists the snubber box 20, it passes through the "D" ring 28 and the "D" ring 26 and ends sewn to the taper plug lock 18.

Figure 2:
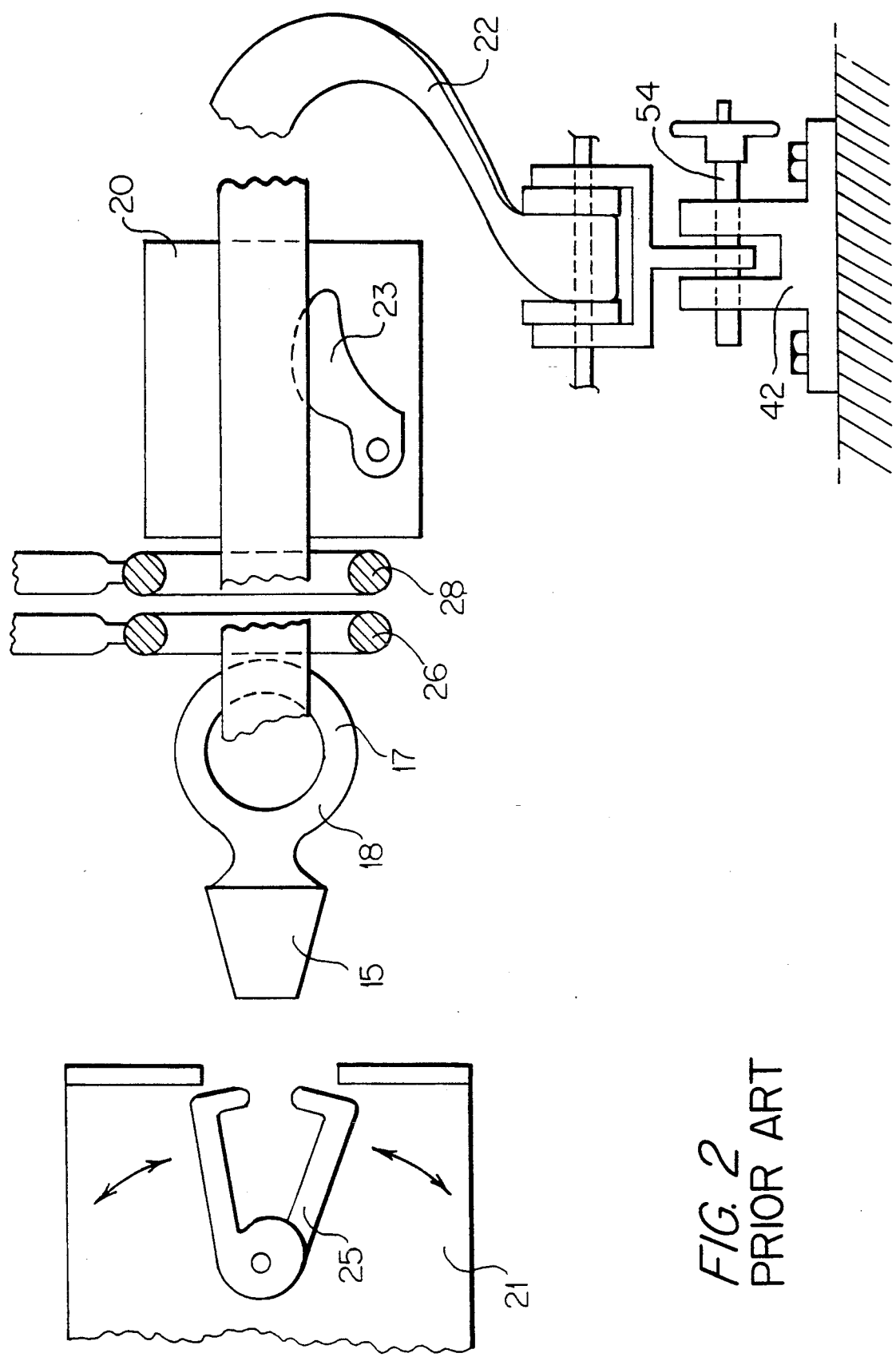
FIG. 2 is a schematic illustration of a mechanism employed in connection with the prior art system of FIG. 1.

FIG. 2 illustrates the floor attachment end portion of the restraint system. The snubber box 20, which is mounted on the seat 21, as shown in FIG. 1, includes a dog 23 for ratchet engagement with a contacted surface of the line 22. This assures that during ejection the line 22 is pulled in a single leg-restraining direction. An opposite or upper end of line 22 passes through the loop 17 of an insertion plug 18 which has a tapered end 15 adapted for insertion within an electrically releasable clamp 25, the latter enclosed within the seat 21. After ejection, the clamp 25 releases the insertion plug so that the pilot is not encumbered with the leg restraint mechanism after he has cleared a cockpit. D-rings 26 and 28 are connected along an intermediate length of line 22 and are linked to the upper and lower leg garters, as shown in FIG. 1.

As will be appreciated from the aforementioned description of the prior art, the garter assembly of the prior art includes many fittings that are subject to snagging on objects within the cockpit and also require extensive and costly assembly during manufacture as well as adjustment for use.

IMPROVEMENT

Figure 3:
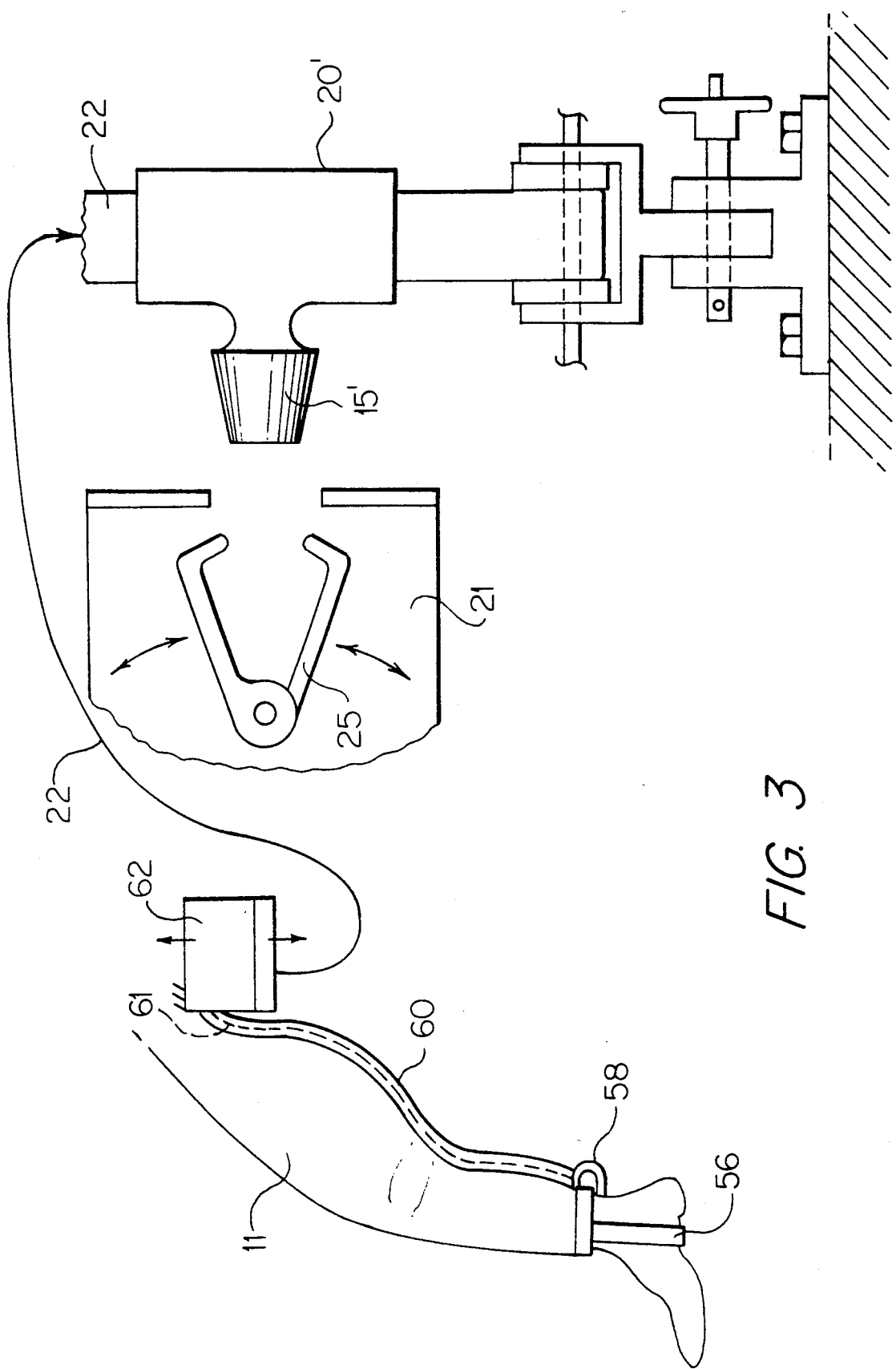
FIG. 3 is a schematic illustration of the improved restraint system of the present invention.

FIG. 3 is an illustration of the present invention. It is to be emphasized that, although the improvement is directed to a leg restraint system, it is equally applicable to an arm restraint system. In lieu of the garter arrangement of the discussed prior art, the present invention utilizes an elongated channel or sleeve 60 sewn along the pants leg of a standard anti-G aviator's suit 11. The channel is actually fabricated from a releasable hook and eye material, such as VELCRO; and a line 61 is located within the channel 60 and is secured to a hook 58 around the wearer's ankle. In order to maintain the hook 58 in a given position, a stirrup 56 may be provided for mounting the hook 58. The line 61 enclosed within the channel 60 is not sewn to the suit or the channel 60 and is therefore free to move within the channel. The upper illustrated end of line 61 is secured within a modular connector 62 of the type disclosed in my U.S. Pat. No. 5,072,897, which issued on Dec. 17, 1991. As indicated in FIG. 3, the leg restraint line 22 is connected at an upper end thereof to the channel-enclosed line 61 through the connector 62. Upon ejection seat movement up, line 61 is pulled out of the VELCRO channel 60 until it is taught between the snubber box 20 and the stirrup.

A further improvement of the present invention is a replacement of the snubber box 20 (FIG. 2) with a more reliable and simplified snubber plug 20'. As in the case with the prior art snubber box 20 (FIG. 2), the line 22 is journaled within the plug 20' and a ratcheting dog (not shown) is enclosed within the plug as was the case with the dog 23 (FIG. 2). The plug has an integrally formed and perpendicularly extending tapered portion 15' for insertion within the clamping member 25 so that the snubber plug 20' may be separated from seat 21 after an aviator has cleared to cockpit—in the same manner as described in connection with FIG. 2.

Accordingly, as will be appreciated from the aforementioned description of the improved restraint system, a simplified, less costly, and more reliable mechanism is offered.

It should be understood that the invention is not limited to the exact details of construction shown and described herein for obvious modifications will occur to persons skilled in the art.

I claim:

1. An aviator leg restraint system comprising:

an unfoldable channel respectively attached to each of the pant legs of a garment, the channel releasably closed with mating hook and eye fabric fasteners which unfold to allow insertion of a first line therein, the first line movably enclosed within the channel;

one end of the line fastened around an ankle, an opposite end attached to a connector;

a first half of the connector attached to the garment, and a second half remaining located within the cockpit of an aircraft;

a second line releasably attached at a first end thereof to the first line in the connector;

means for releasably attaching an opposite end of the second line to a cockpit floor; and a snubber member for journaling the second line along an intermediate length thereof, the member having an integrally formed tapered plug adapted for releasable insertion into an electrically actuated clamping member which is located within a seat of the cockpit.

* * * * *